US007404535B2

(12) United States Patent
Mossman et al.

(10) Patent No.: US 7,404,535 B2
(45) Date of Patent: Jul. 29, 2008

(54) VIDEO MONITOR UNIT

(75) Inventors: Rob Mossman, Boulder, CO (US); Andy Davis, Arlington Heights, IL (US)

(73) Assignee: Elexa Consumer Products, Inc., Chicago, IL (US)

( * ) Notice: Subject to any disclaimer, the term of this patent is extended or adjusted under 35 U.S.C. 154(b) by 0 days.

(21) Appl. No.: 11/927,383

(22) Filed: Oct. 29, 2007

(65) Prior Publication Data

US 2008/0067305 A1 Mar. 20, 2008

Related U.S. Application Data

(63) Continuation of application No. 11/378,995, filed on Mar. 17, 2006.

(60) Provisional application No. 60/663,031, filed on Mar. 18, 2005.

(51) Int. Cl.
*A47H 1/10* (2006.01)

(52) U.S. Cl. ........................ 248/323; 248/922; 248/923

(58) Field of Classification Search ................. 248/304, 248/307, 690, 692, 340, 323, 324, 325, 923, 248/922, 920, 919, 139, 140; 40/713; 361/681; 348/825

See application file for complete search history.

(56) References Cited

U.S. PATENT DOCUMENTS

| | | | | |
|---|---|---|---|---|
| 4,854,456 | A * | 8/1989 | Lee | 211/14 |
| 5,848,489 | A * | 12/1998 | Hartley et al. | 40/713 |
| 6,554,242 | B2 * | 4/2003 | Kim | 248/371 |
| 6,604,722 | B1 * | 8/2003 | Tan | 248/276.1 |
| 6,964,399 | B1 * | 11/2005 | O'Neill | 248/292.13 |
| 7,097,143 | B2 * | 8/2006 | Kim et al. | 248/201 |
| 7,175,146 | B2 * | 2/2007 | Kim | 248/279.1 |
| 7,178,775 | B2 * | 2/2007 | Pfister et al. | 248/292.14 |
| 7,345,870 | B2 * | 3/2008 | Shin | 361/681 |
| 2005/0274858 | A1 * | 12/2005 | Fedewa | 248/284.1 |
| 2006/0065800 | A1 * | 3/2006 | Bremmon | 248/274.1 |
| 2006/0231711 | A1 * | 10/2006 | Shin | 248/291.1 |
| 2007/0221807 | A1 * | 9/2007 | Park | 248/324 |
| 2007/0262215 | A1 * | 11/2007 | Tan | 248/201 |
| 2008/0073471 | A1 * | 3/2008 | Beger | 248/309.1 |

* cited by examiner

*Primary Examiner*—A. Joseph Wujciak, III
(74) *Attorney, Agent, or Firm*—Cardinal Law Group

(57) ABSTRACT

A video monitor mount includes a first piece adapted to be fastened to a wall and a second piece adapted to be fastened to a video monitor. The first piece includes a bubble level and a first mating component and the second piece includes a second mating component. The first piece or the second piece comprises an extension arm having a rotation joint that comprises a brass bushing.

5 Claims, 17 Drawing Sheets

10
31
30
12
26
25
11
20
35

VIDEO MONITOR UNIT

RELATED APPLICATION

This application claims the benefit of and priority to U.S. patent application Ser. No. 11/378,995 filed Mar. 17, 2006, as a continuation application. This application claims priority to U.S. Provisional Application No. 60/663,031, titled Video Monitor Mount, filed Mar. 18, 2005, the entirety of which is incorporated by reference.

FIELD OF THE INVENTION

The present invention is directed to a mount for a video monitor. More specifically, the invention is directed to a wall mount for mounting a flat panel television or video monitor.

BACKGROUND OF THE INVENTION

Current video monitor technology is moving rapidly to flat screens. LCD and plasma screens are popular flat screen products. These flat screens can be mounted in a traditional manner on a horizontal surface by placement on a stand. It is also now popular to mount flat screens on a wall. Problems with mounting flat screens onto a wall include making sure that the screen is level. Also, a cord or cords that are connected to the back of the flat screen monitor can give a messy appearance. Further, rotating support arms can be "sticky" and prevent easy rotation of the mounted monitor. Finally, the installation process itself can be difficult or frustrating. An installer may never know if the mount is actually, properly placed together. If improperly assembled, then there is a possible situation of an unstable mounting relationship.

It is an object of the present invention to provide a wall mount that overcomes these and other disadvantages.

SUMMARY OF THE INVENTION

The present video monitor mount includes a combination of features directed to mounts for flat screen monitors for television, video, and computer applications. The mounts include one or more of an integral bubble level, a cord management hook, an audible click installation spring and a brass bushing/stainless steel rotating joint. These features simplify and organize the mounting process.

DETAILED DESCRIPTION OF THE PREFERRED EMBODIMENTS

Figure 1:
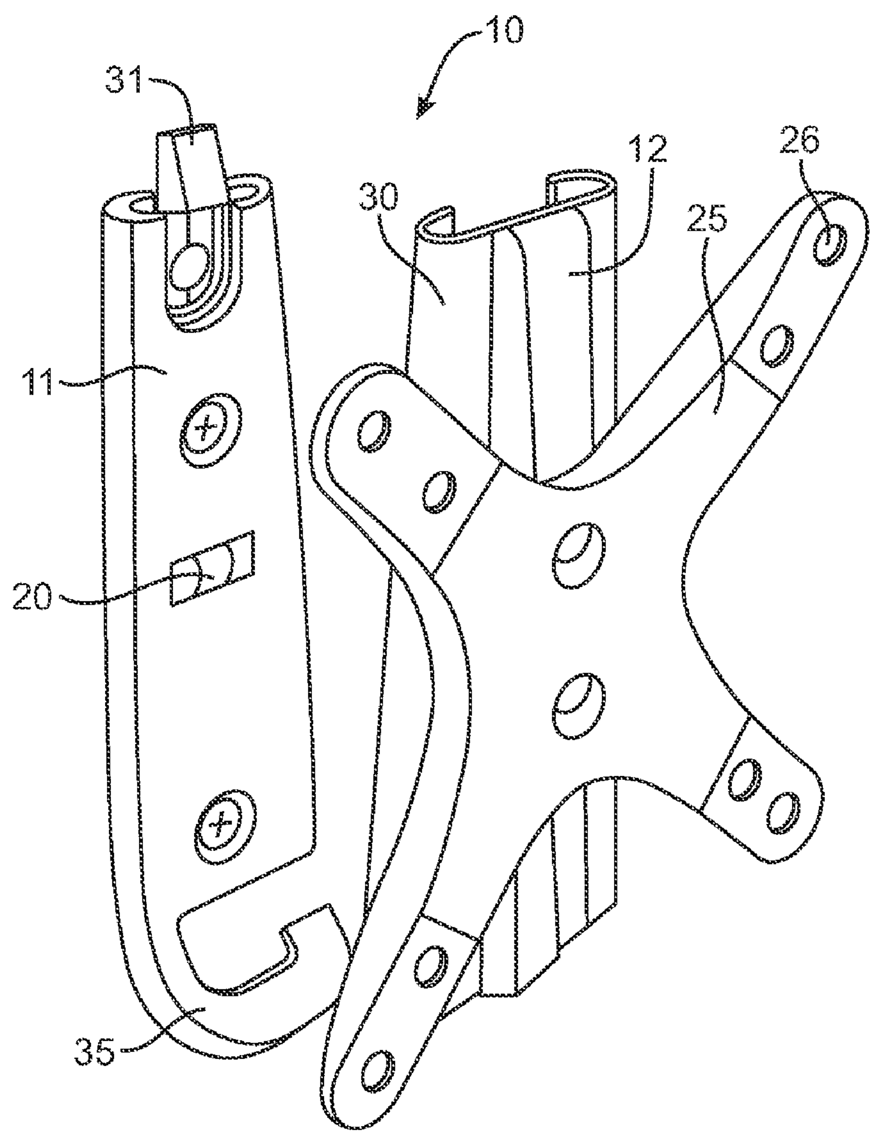
FIG. 1 is an exploded perspective view of an embodiment of the present mount.
Figure 2:
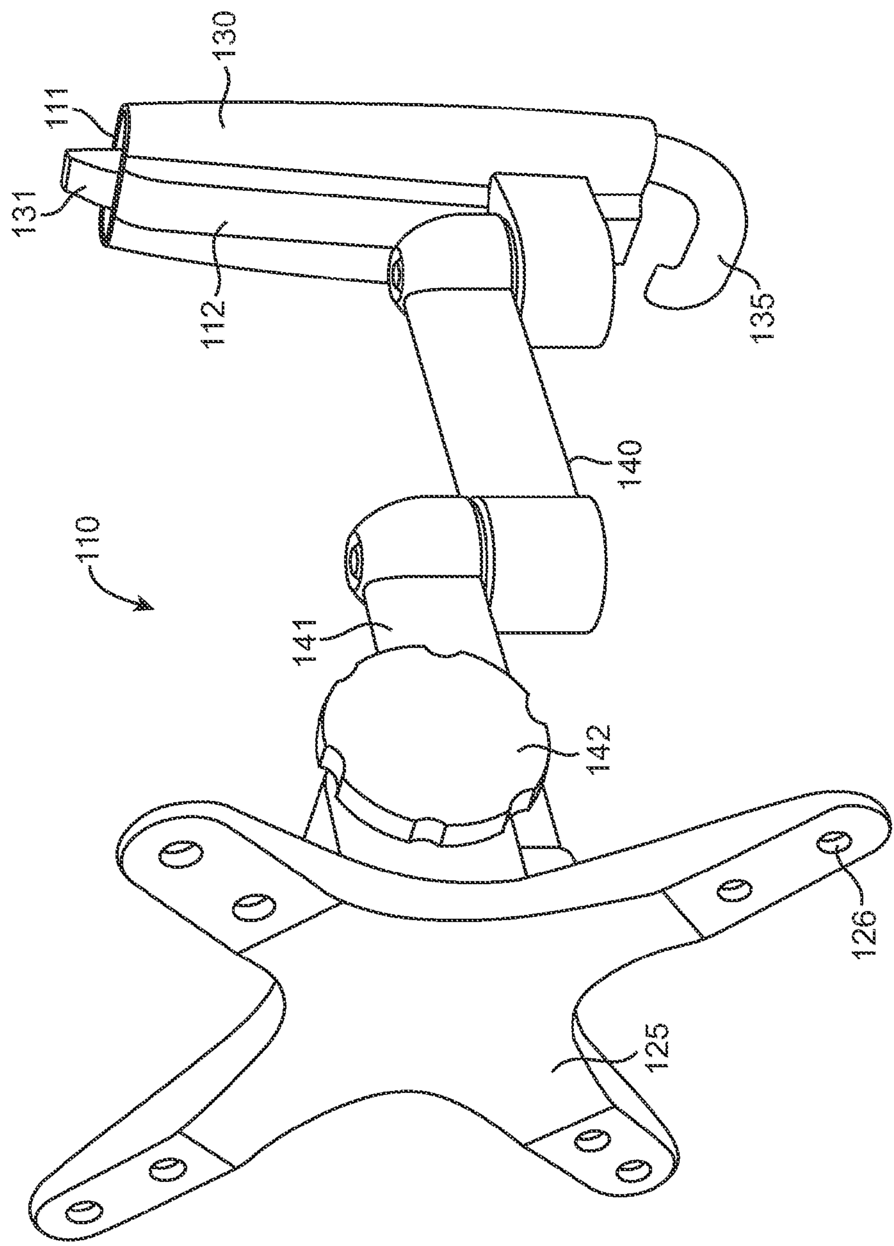
FIG. 2-5 are perspective, side, elevation, top elevation and rear views, respectively, of a second embodiment of a mount described herein.
Figure 3:
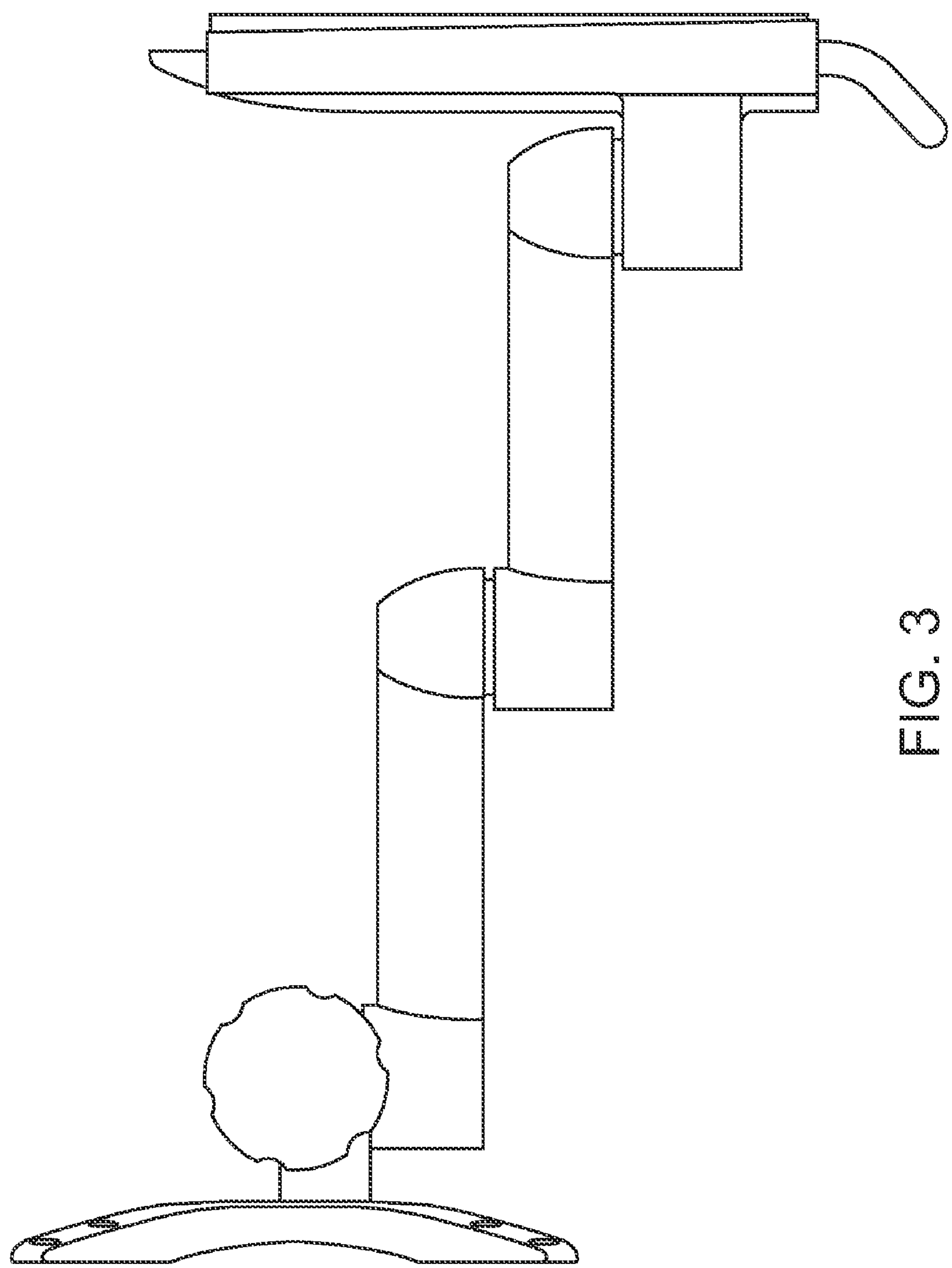
Figure 4:
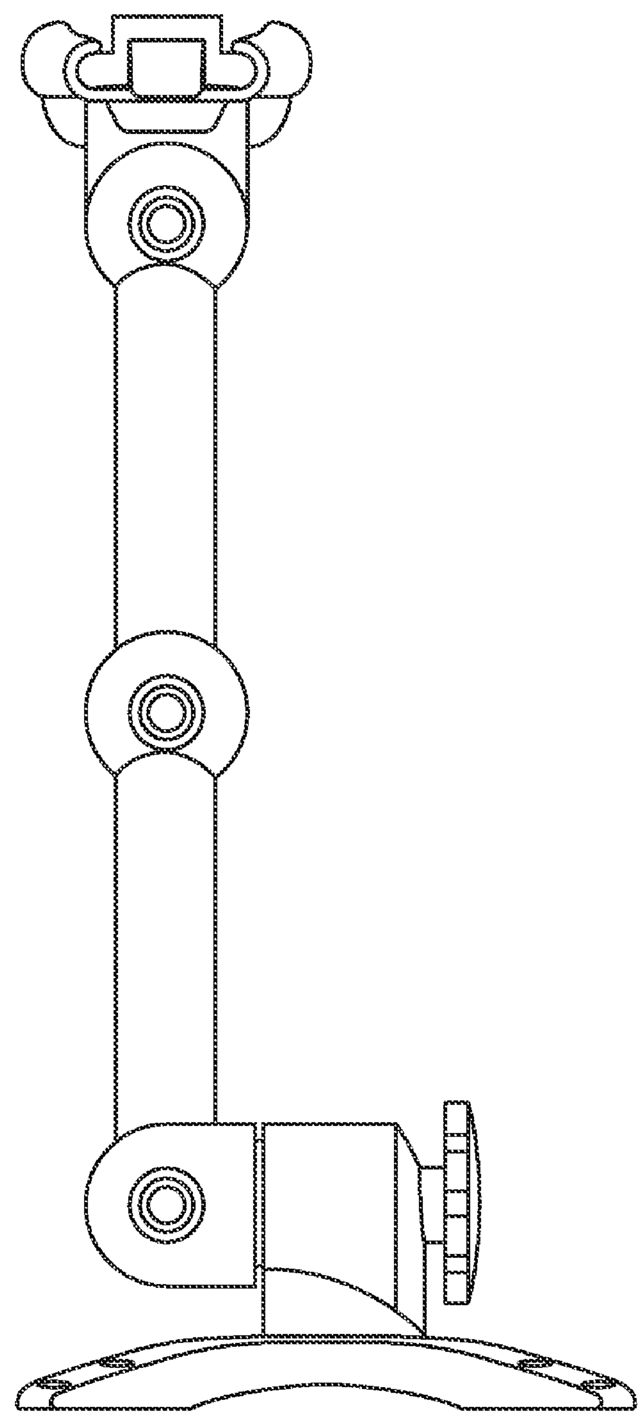
Figure 5:
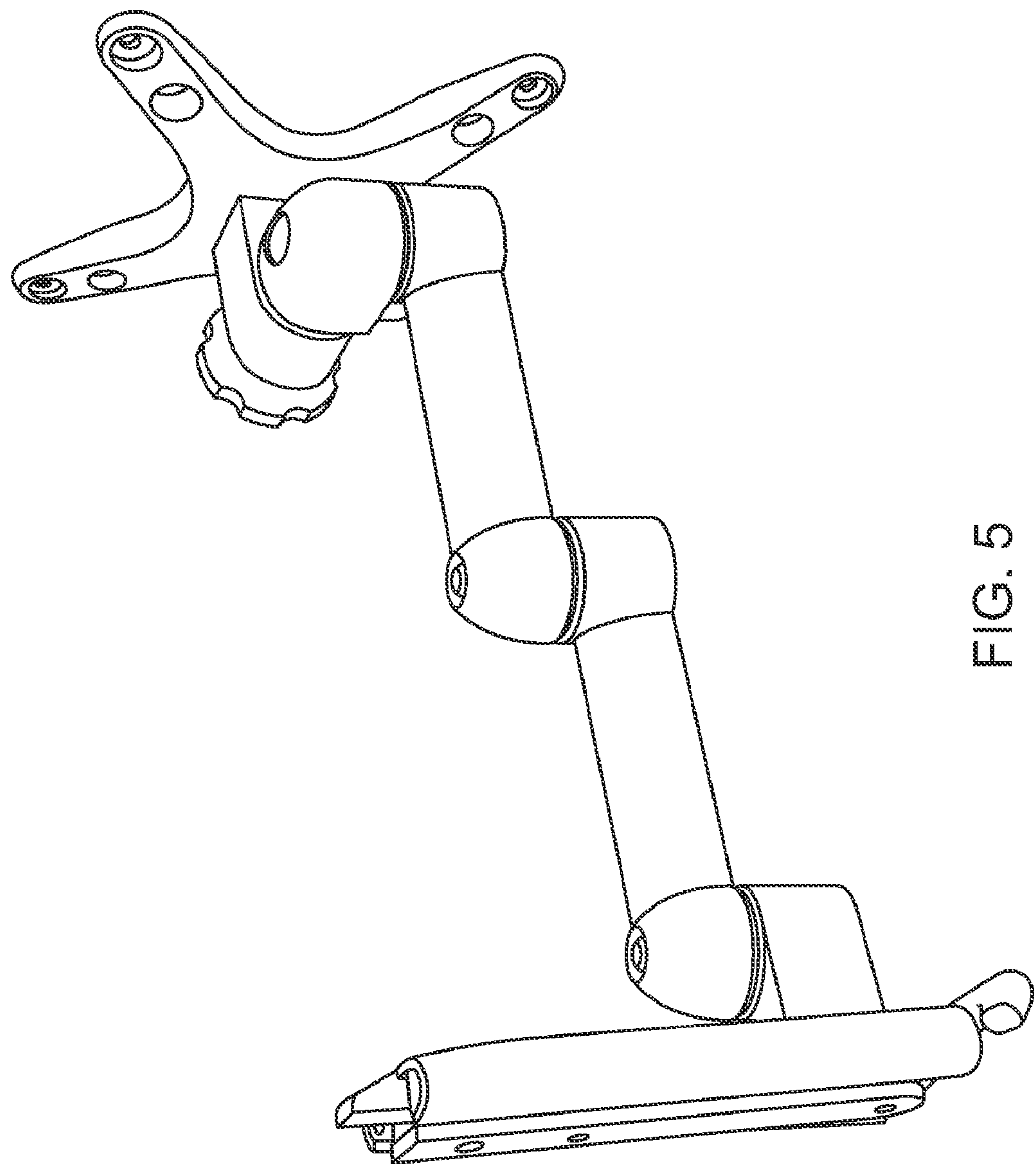
Figure 6:
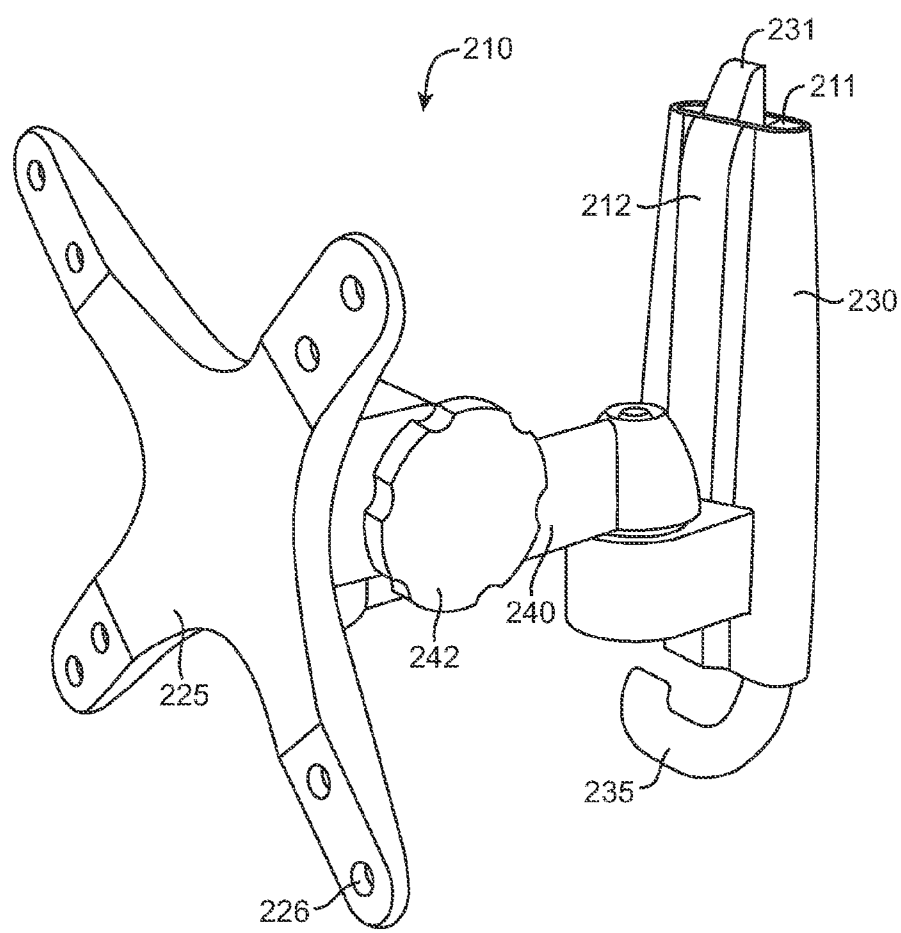
FIG. 6-9 are perspective, side elevation, top elevation and rear views, respectively, of another embodiment of a mount as described herein.
Figure 7:
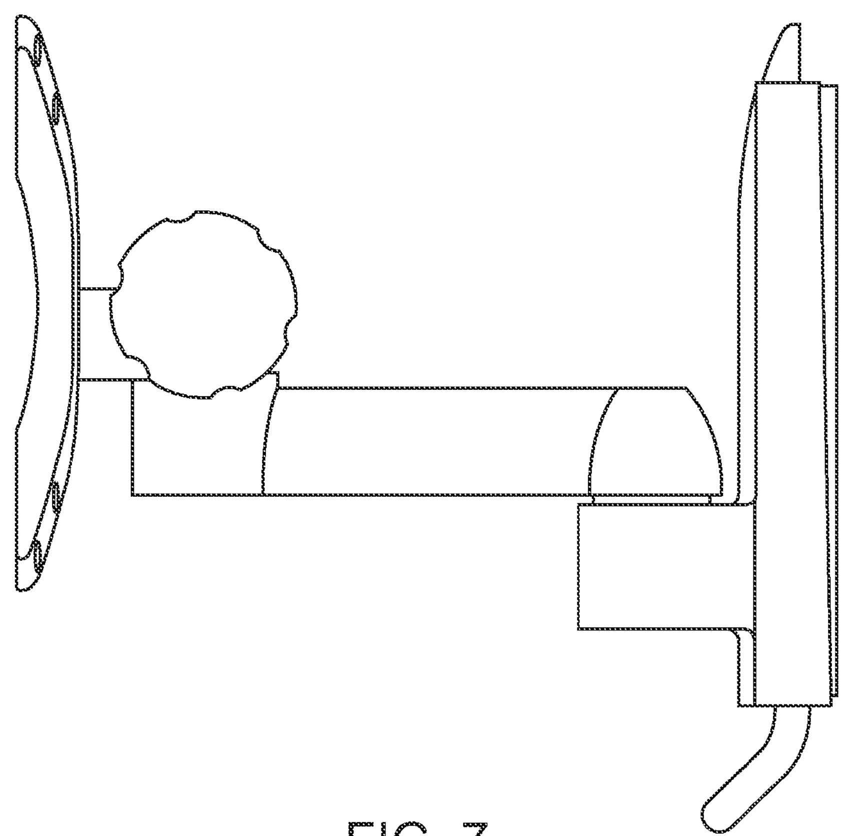
Figure 8:
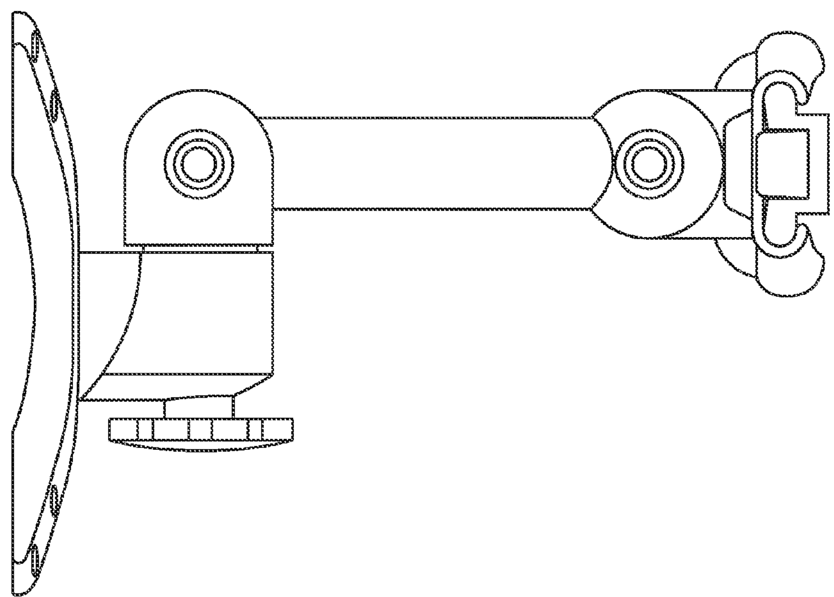
Figure 9:
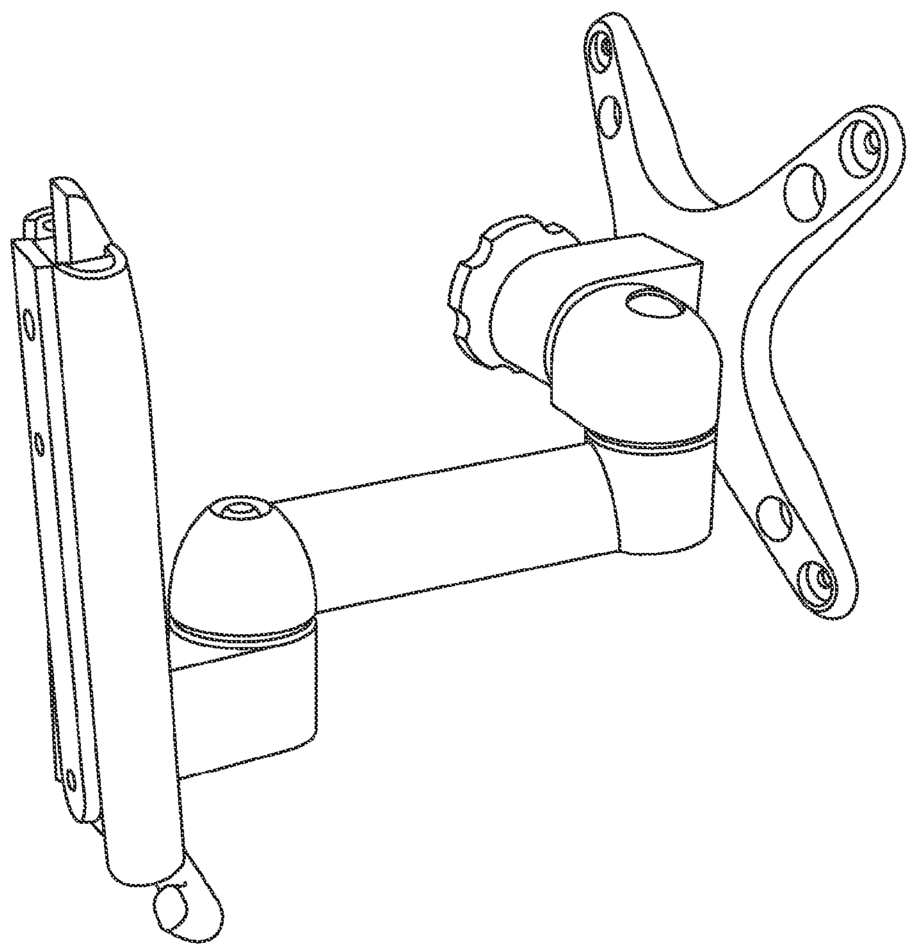
Figure 10:
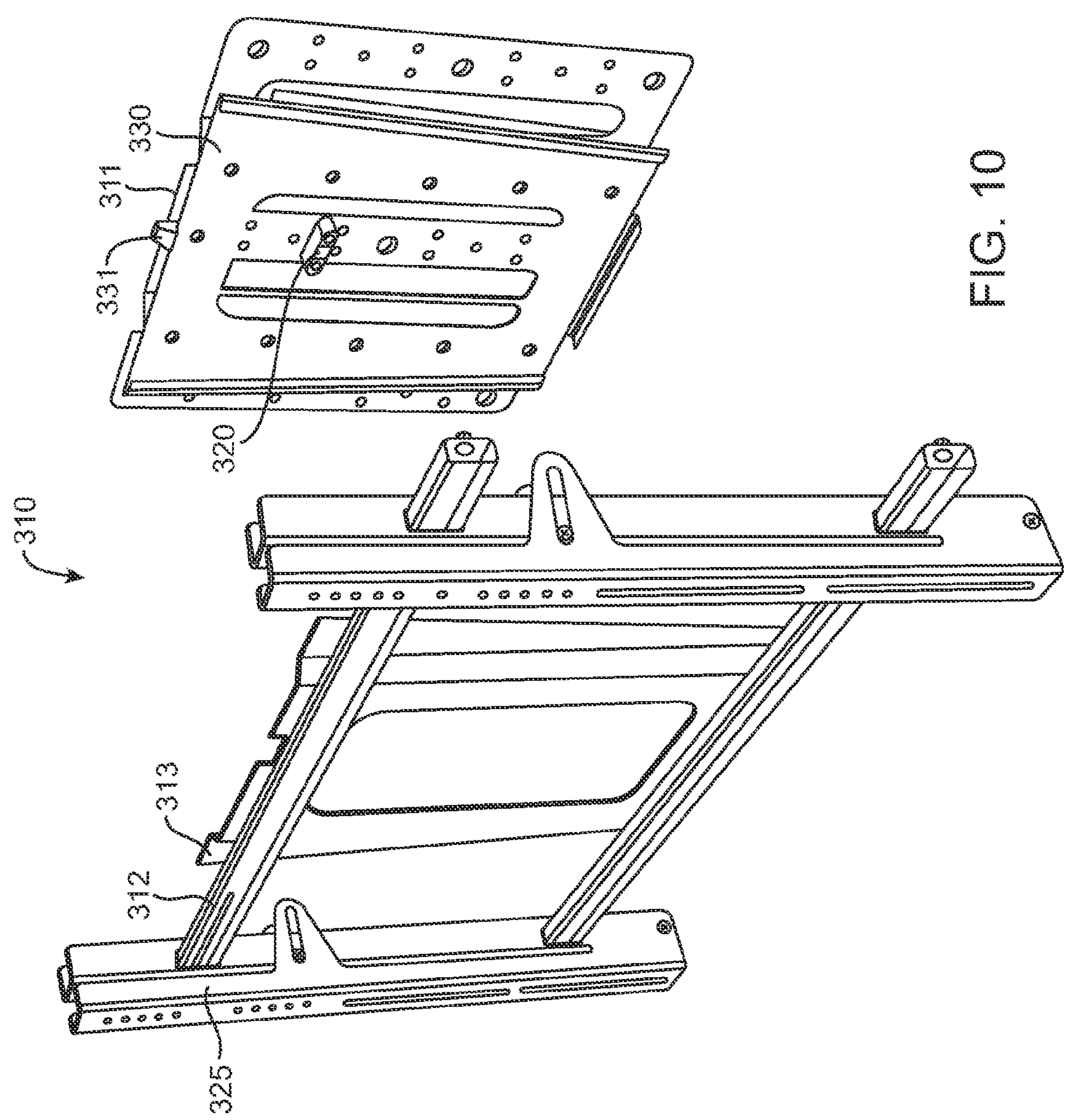
FIG. 10 is a perspective, exploded view of a fourth embodiment of a mount as described herein.
Figure 11:
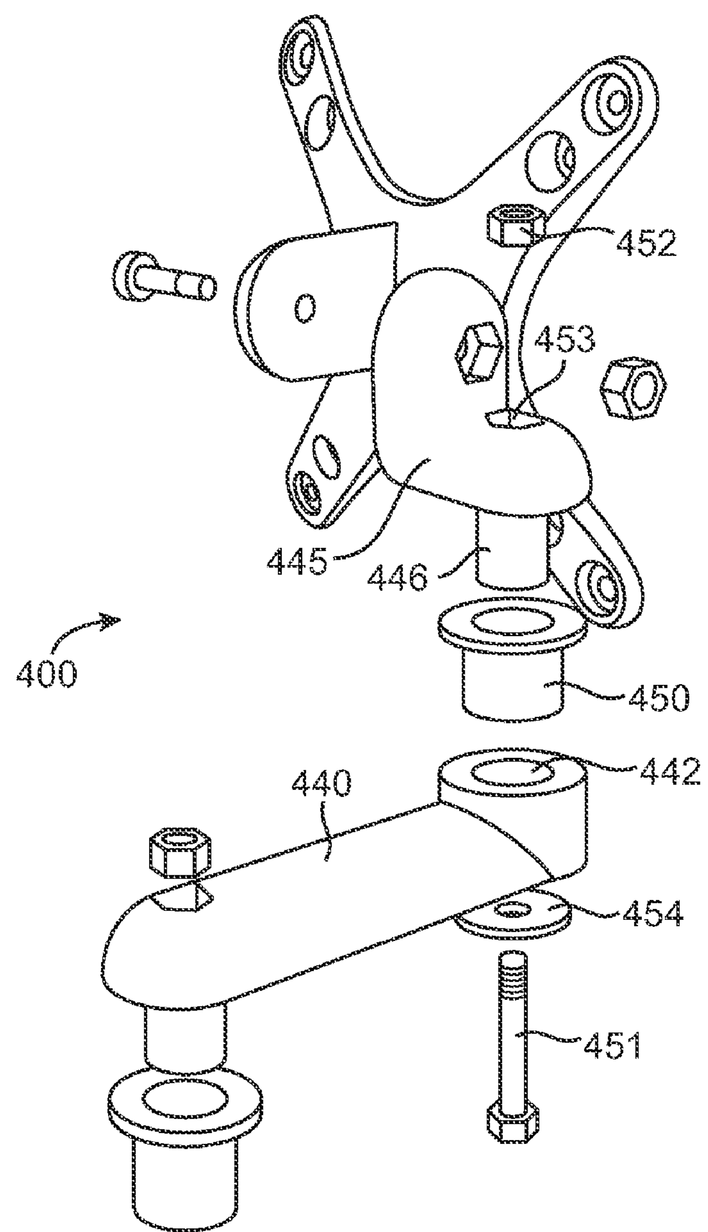
FIGS. 11 and 12 are exploded, perspective views of mounts like those shown in FIGS. 2-9.
Figure 12:
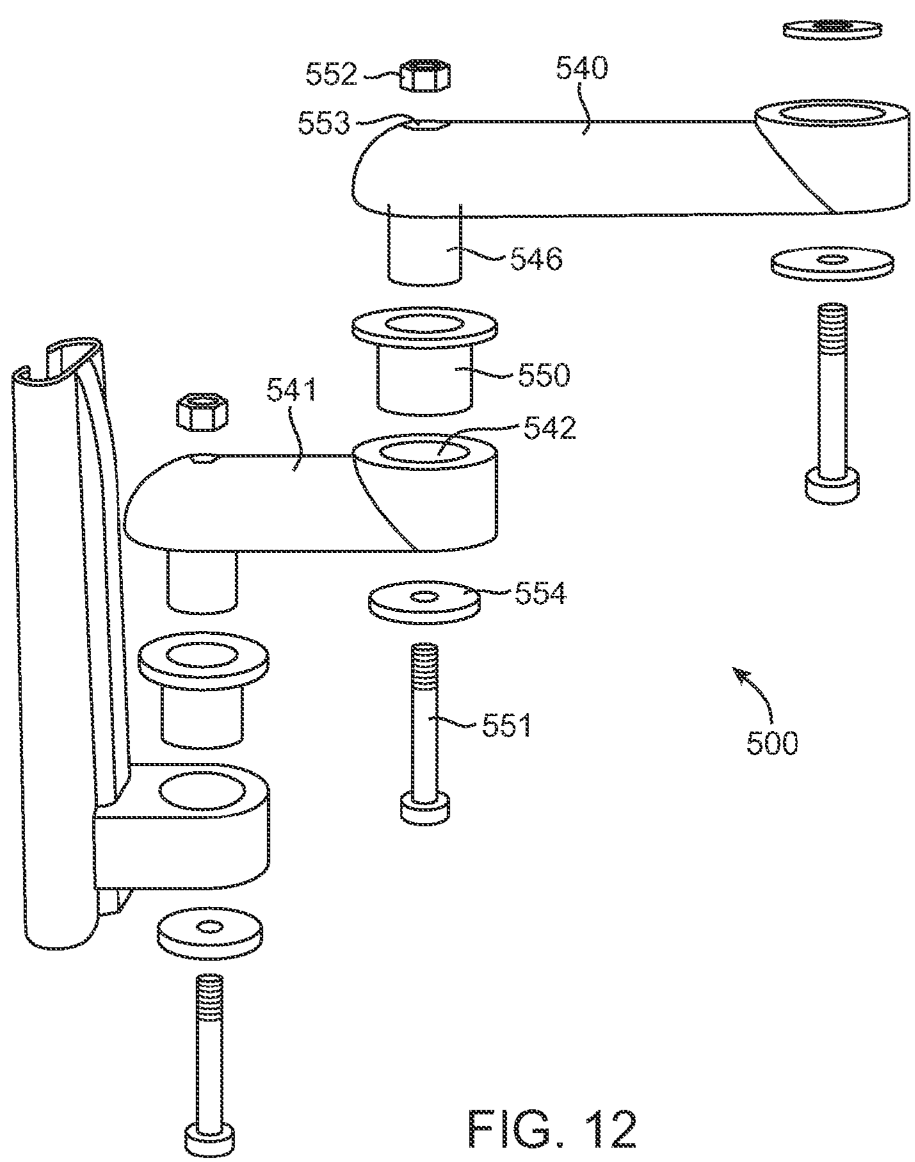

The attached figures are alternative examples of mounts in accordance with the present invention. FIG. 1 is a perspective view of a simple, wall-flush mount 10. FIGS. 2 through 5 are perspective, right side elevation, top, and rear perspective views of an alternative embodiment of the present mount having two extension arms. FIGS. 6 through 9 are perspective, right side elevation, top, and rear perspective views of a still further embodiment of the present mount having a single extension arm. FIG. 10 is a perspective view of a third alternative embodiment of the mount. FIGS. 11 and 12 are exploded views that display some of the working components of the support arms. FIGS. 13-17 show various view of a still further embodiment of the mount described herein. Of course, other variations and configurations of the present mount may be developed that include one or more of the distinctive features of the present invention.

In FIG. 1, the mount 10 includes a two piece system having a wall piece 11 and a monitor piece 12. The wall piece 11 is adapted to be mounted on a wall or other vertical surface. The wall piece 11 includes a bubble level 20 to ensure that the wall piece is mounted in a vertical fashion. The wall piece 11 also includes a cord management hook 35 adapted to organize and retain the cords that feed into and out of the back of the monitor. At the top of the wall piece 11 is a spring lock 31. In FIG. 1, the wall piece 11 embodies a male mounting component. When the monitor piece 12 is mounted in a sliding fashion over the wall piece 11, the spring retainer 31 will give an audible snap to let an installer know that the mounting piece 12 has been fully and properly engaged over the wall piece 11. The spring retainer 31 releaseably locks the monitor piece 12 in place on the wall piece 11. The shape of the wall piece 11 enables it to be a male mating component and is more narrow at the top and diverges at least partly so that the middle or base of the wall piece is wider than the top. The mounting piece 12 includes a sleeve that is a female mating component 30 corresponding to the shape of the wall piece 11 and is matingly received thereon. The female component 30 slides down over and around the wall piece 11. As a friction fit, the female component 30 will press against the retaining clip 31 until it has slid completely over the wall piece 11. The mounting piece 12 also includes an "X" component 25 that is used to attach to the back of a video monitor. There are included multiple holes 26 that correspond to a broad range of monitor products and make it attachable to the back of the monitor.

FIGS. 2 through 5 illustrate an alternative embodiment of the mount 110. In this embodiment of a mount 110 there is also a wall piece 111 that includes a bubble level (not shown) a spring clip 131 and a cord management hook 135. This wall piece 111 is functionally identical to the wall piece 11 described earlier. Likewise, the female piece 112 includes a female component 130 that mounts over the wall piece 111 in a fashion similar to the monitor piece 12 described earlier. There is shown an "X" component 125 having holes 126 for fastening to the back monitor. The additional; features of this mount 110 include the extension arms 140 and 141 that are rotatably connected to each other. There is a further knob 142 that allows the "X" component 125 to be swiveled or rotated upwardly or downwardly to direct the face of a connected monitor in a desirable direction.

FIGS. 6 through 9 illustrate a still further embodiment of a mount 210. This mount includes the wall piece 211 having an integral bubble level (not shown). There is also a cord management hook 235 and a mounting spring clip 231. The female piece 212 includes a female component 230 that functions similarly to that female component 30 described in connection with FIG. 1. There is also an "X" component 225 that is adapted to fasten to the back of the monitor. Holes 226 are provided to fasten the mount to the back of the monitor. In this embodiment 210, a single extension arm 240 is rotatably connected to the mount piece 212. Similarly, there is a screw knob 242 to allow for up and down rotation similar to the knob 142 described in connection with FIGS. 2 through 5.

FIG. 10 illustrates a third embodiment of a mount 310. This mount includes the wall piece 311 having an integral bubble level 320. There is also a mounting spring clip 331. The wall piece 311 further includes a female mating component 330 attached to it. The monitor piece 312 includes a male mating component 313 fixed to it. The male component 313 is adapted to be received in the female component 330. The female component 330 is wider at its top than at its base to thereby receive and hold secure the male component 313. Once the male component 313 is fully inserted within the female component 330, the mounting spring clip 331 will lock the mounting component 312 in place. The monitor component 312 further includes braces 325 which are adapted to be fastened to the back of a monitor. The braces 325 are at least partially rotatably connected to the monitor piece 312 so that a monitor may be titled forward or back with respect of the mount.

The video monitor that is supported by the present mounting system can be quite heavy. Accordingly, for any system which includes the rotation joints shown, for instance, in the mounts of FIGS. 2-9, the movement of the extension arms must be made smooth and simple to make the mount effective. If the joints have a high level of friction between them, then the rotation feature becomes difficult to exercise if possible at all. A "sticky" or "jerky" movement may risk a failure of the whole system if a user tries to force the movement of the monitor. Turning now to FIGS. 11 and 12, there is shown the use of a brass bushing 450 and 550 to facilitate the smooth and easy rotation of those joints. Specifically with reference to FIG. 11, the mounting apparatus 400 includes a support arm 440. This support arm 440 supports the ultimate bracket 445 that ultimately carries the mounting support for a monitor. Support arm 440 includes a vertical aperture 442 in which is mounted a round bushing 450. The bracket 445 includes a male rod 446 that is received inside the cylindrical aperture inside the bushing 450. A bolt 451 passes through a washer 454 and through the male post 446 where it is secured to a nut 452 that is seated in an aperture 453 of the bracket 454. Once tightened, the bracket 445 is able to be rotated about on independent of the arm 440. This rotation is simplified by the brass bushing 450 coupled with the stainless steel bolt 451 and the other metal components 446 and 442 that come in contact with the brass bushing. The softness and durability of the brass bushing 450 facilitate easy rotation yet durability for a mounting apparatus.

FIG. 12 is another view showing the use of a brass bushing 550 in connection with a dual support arm 540 and 541 system. The support arms 540 and 541 are rotatably connected through use of a post component 546 of support arm 540 that is received in the cylindrical aperture in the middle of the brass bushing 550. The brass bushing 550 is received in the circular aperture 542 of the second support arm 541. A stainless steel bolt 551 passes through a washer 554 and is threaded into a nut 552 that is seated within the aperture 553. As described in connection with FIG. 11, the soft nature of the brass bushing in connection with the remaining steel parts of the support arm provide for smooth and easy rotation of the support arms with respect to each other.

As shown, but not further described in the drawings, other brass bushings may be used in connection with each rotating joint to ensure that the entire rotating function and swivel function of the mount is made simple and smooth.

In each of the embodiments of the mounts described herein, there is both a male mating component and a female mating component. Each of the mounts is a two piece or two component system where the male component embodies or is a part of and fixed to one piece and the female component is a part of or embodies the other piece. In this two component system, the wall mount component is able to be fixed on a wall in a level fashion using the integral bubble level. The male/female pieces are then engineered so that they fit the male piece within the female piece to likewise be oriented in a level manner. The audible click of the spring clip in each case allows a user to have confidence with respect to the proper installation of the female component about the male component or vice versa. The respective clips also provide the extra insurance that the mount will not allow the monitor which it is supporting to slide out of place.

The material used to manufacture all of the components of the present invention must be rigid and durable enough to support the weight of a video monitor. Different polymers and composites may be acceptable. Also, metal pieces including aluminum or steel may be used to accomplish the present purpose. With respect to the cord management hooks 35, 135, and 235, this is a hook provided at the bottom of the respective wall piece that allows for cables going into and out of the monitor to be collected and stored together. In each case, the spring clip 31, 131, and 231 must be made of a resilient material that provides an audible snap action once the mount is correctly assembled. This snap will provide an audible confirmation to an installer that the mounting assembly is correctly pieced together.

Figure 13:
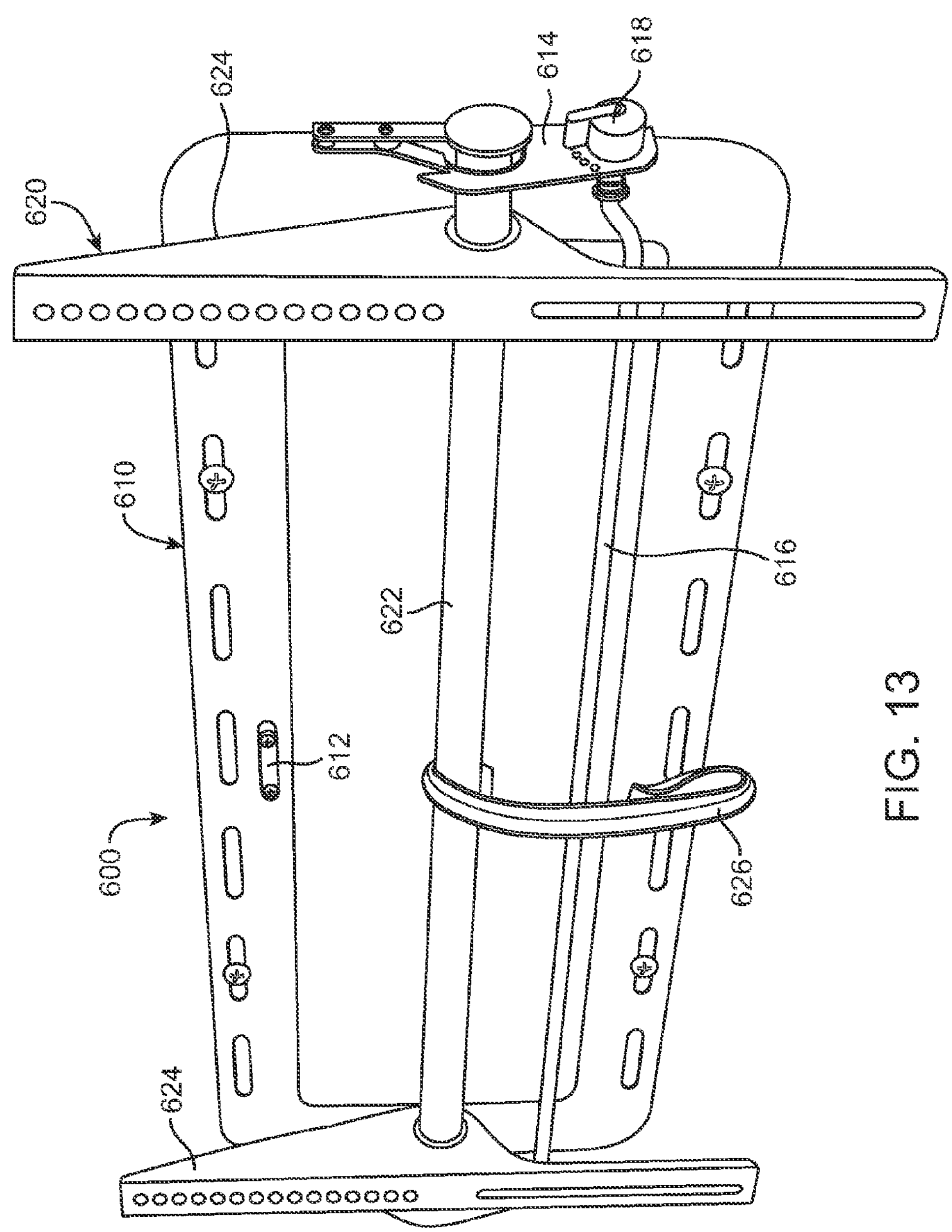
FIG. 13 is a perspective view of a fifth embodiment of a mount as described herein.
Figure 14:
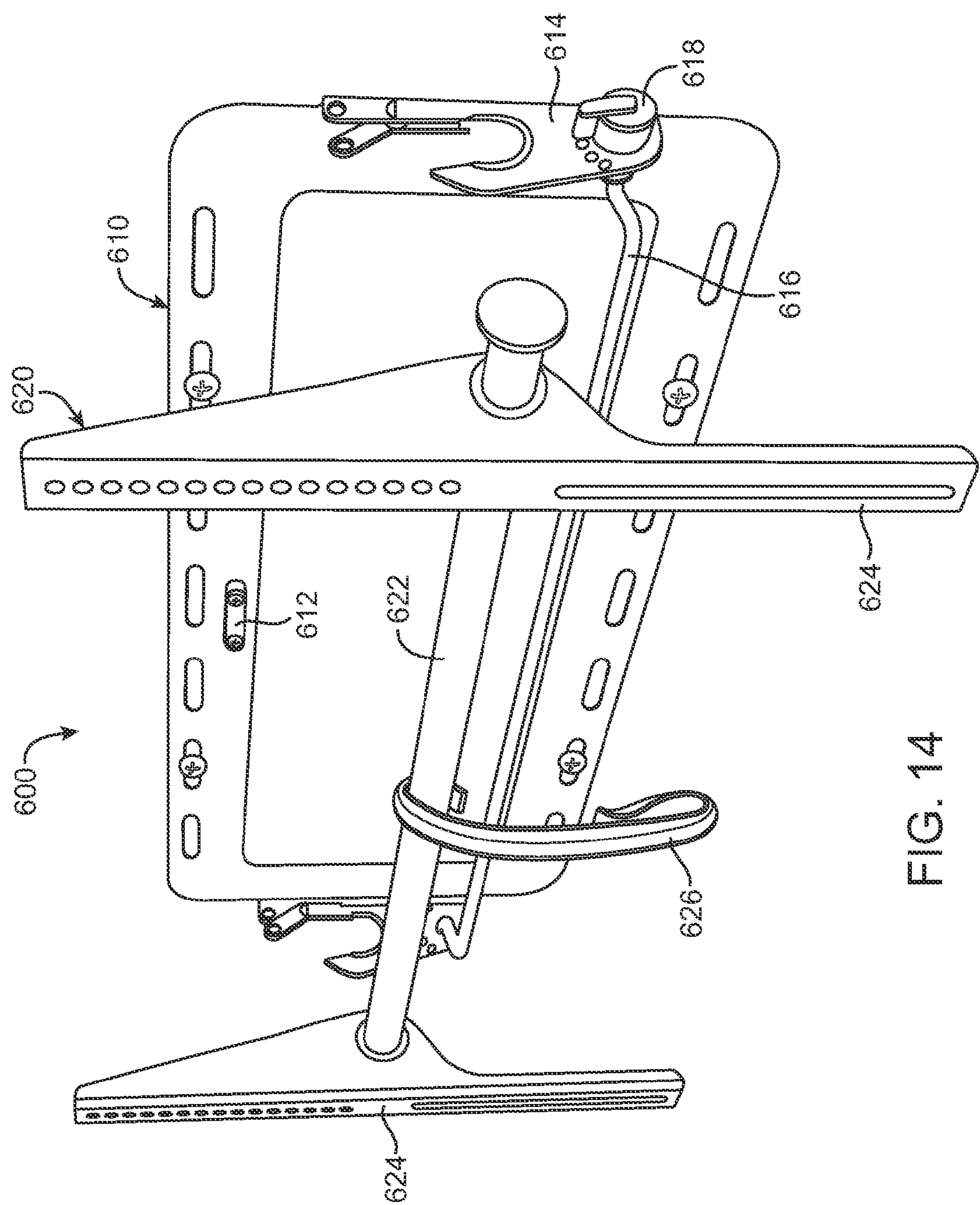
FIG. 14 is an exploded perspective view of the mount shown in FIG. 13.
Figure 15:
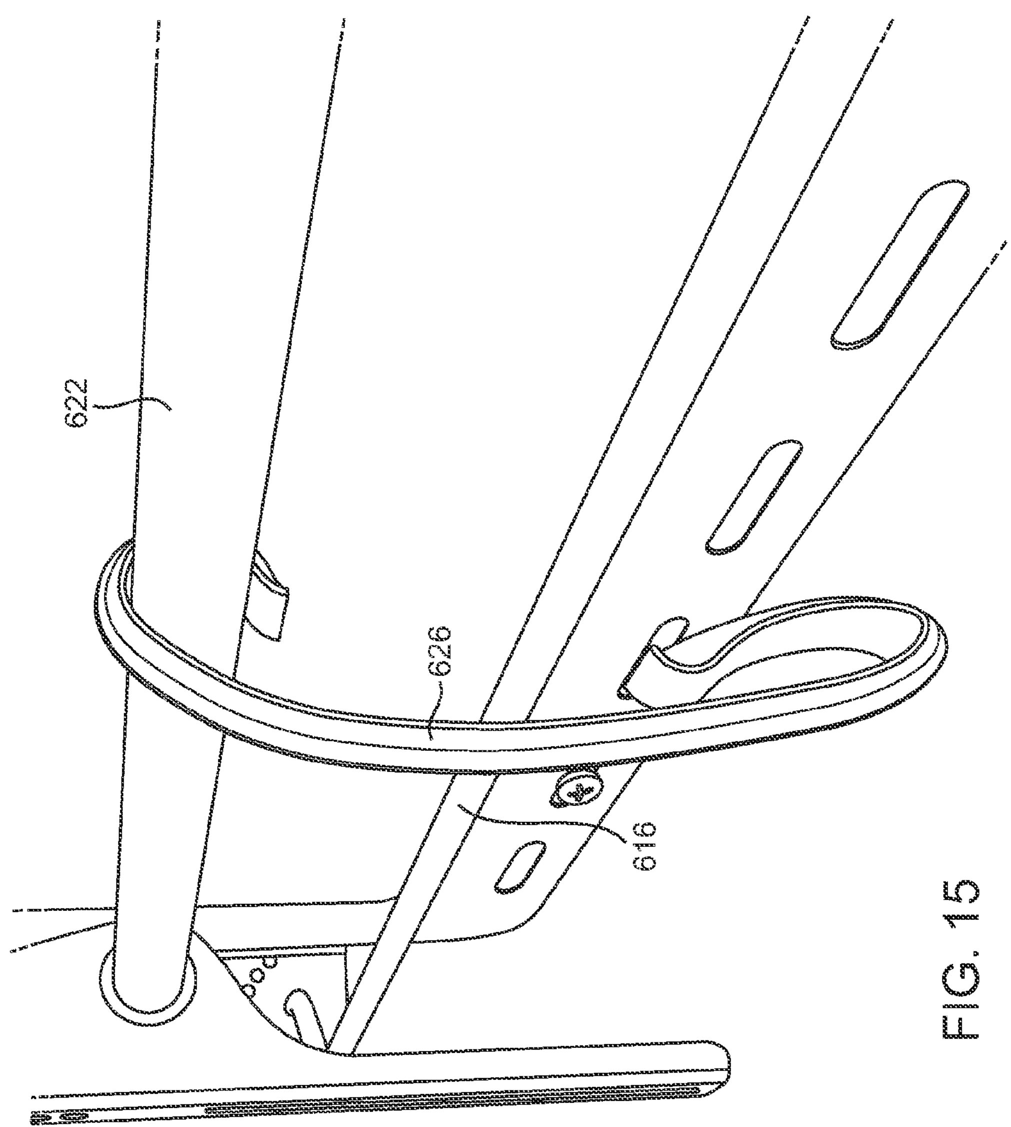
FIG. 15 is a perspective view of a portion of the mount shown in FIG. 13 focusing on the cord management hook feature of the mount.

FIGS. 13-17 illustrate a still further embodiment of a mount in accordance with the present invention. The mount 600 includes a wall piece 610 having an integral bubble level 612. The wall piece 610 further includes a pair of cradles 614. The monitor piece 620 includes a pair of vertical braces 624 that are adapted to be fashioned to the back of the monitor. The brackets 624 are rotatably mounted to a support bar 622. The support bar 622 rests in and is carried by the cradle 614 of the wall piece 610. The monitor piece further includes a cord management hook 626. The pitch of the brackets 624 may be varied by tilt bar 616 that can be adjusted through using knob 618. The tilt bar 616 and knob 618 are attached to the cradle 614 portion of the wall piece 610. FIGS. 13 and 14 shown the assembled and exploded views of the mount 600 as described. FIG. 15 is directed primarily to the cord management hook 626 that is adapted to be hung from the support bar 622. It may be slid to various locations along that support bar 622. The hook 626 is fabricated of a durable but flexible plastic material.

Figure 16B:
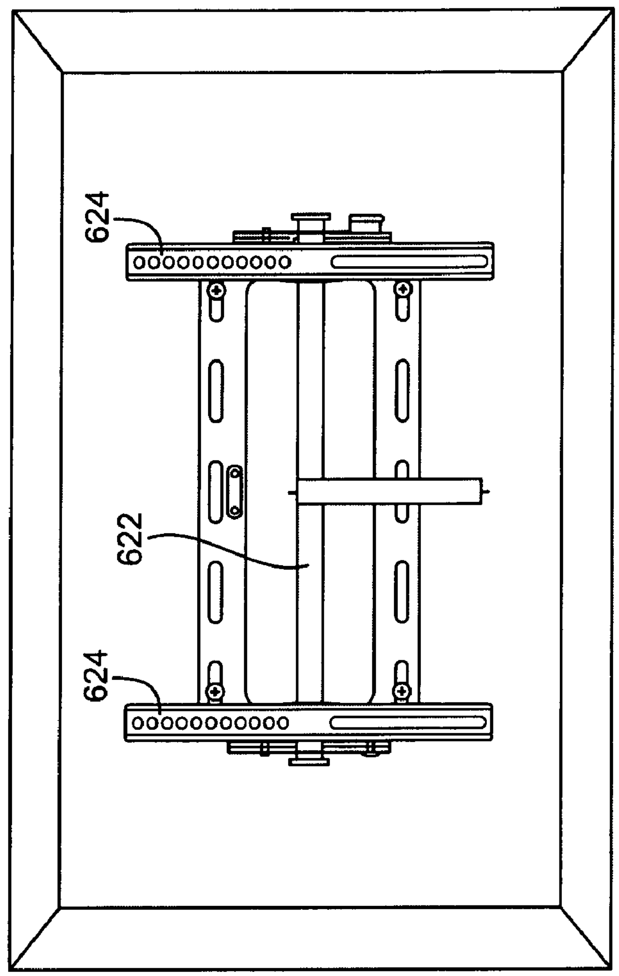
FIGS. 16A and 16B are rear elevation views of the mount shown in FIG. 13.
Figure 16A:
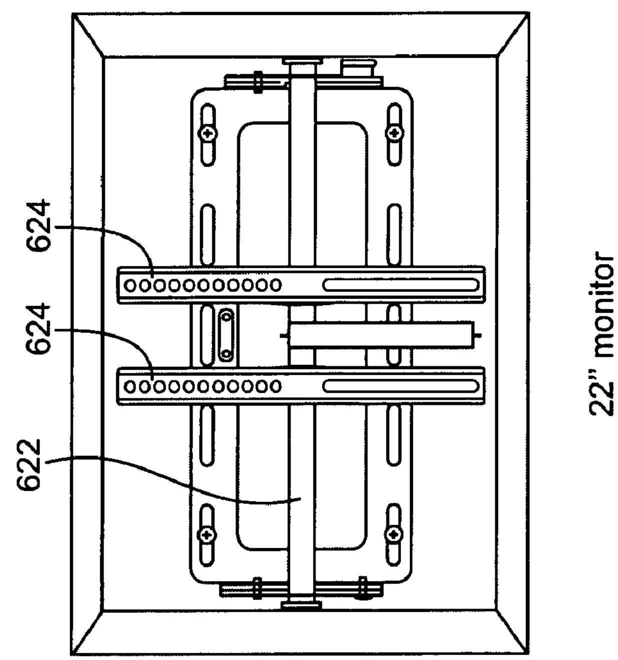
Figure 17C:
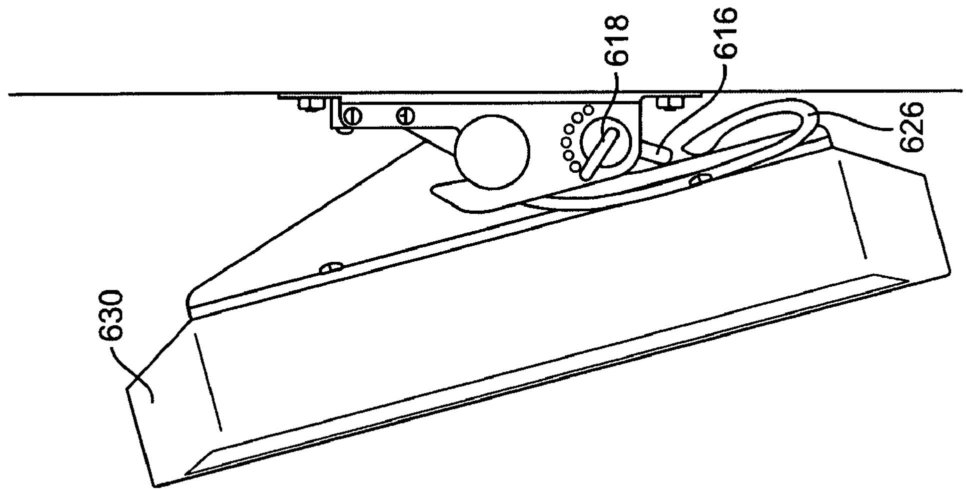
FIGS. 17A to 17C are side elevation views of the mount shown having a flat screen monitor mounted on it in various tilt positions.
Figure 17B:
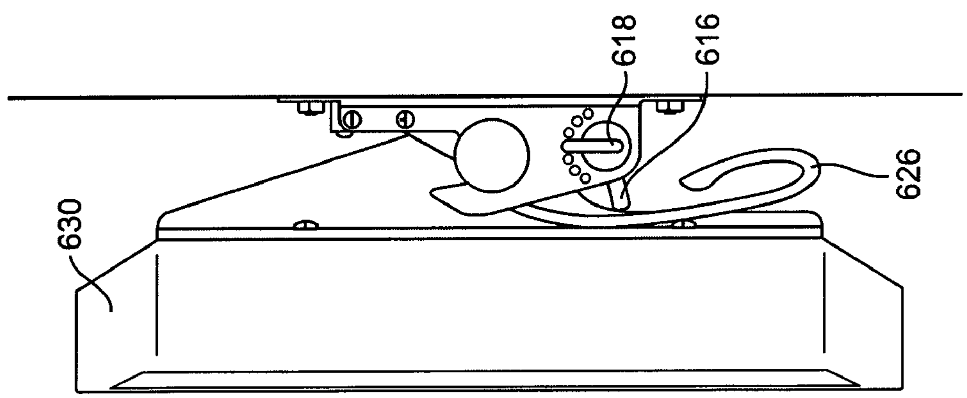
Figure 17A:
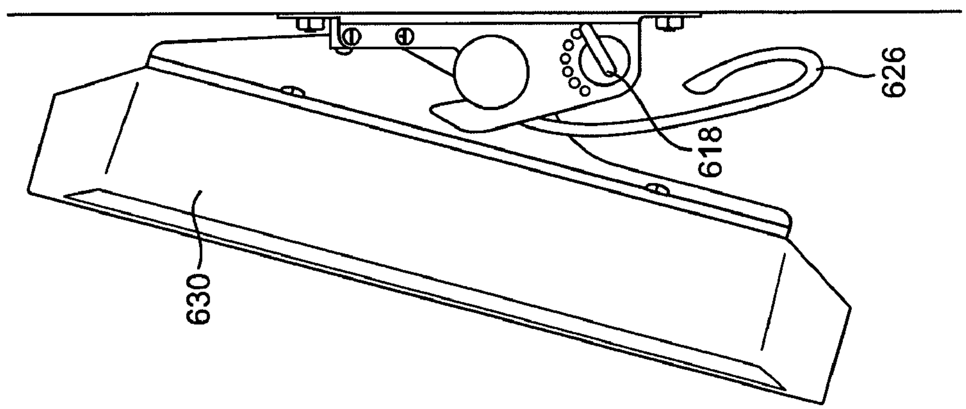

FIGS. 16A to 17C demonstrate the variability of the mount 600. In FIGS. 16A and 16B, the mount 600 is shown with bracket 624 in a tight or narrow configuration on the support bar 622 (FIG. 16A) and also in the wide or spread position on the support bar (FIG. 16B). FIGS. 16A to 16B illustrate that the mount may be used in connection with a broad range of monitors having different points of attachment along their lateral length on the back of the monitor. FIGS. 17A to 17C demonstrate how the monitor 630 may be mounted at variable pitches. The knob 618 will turn the tilt bar 616 in such degrees as to tilt monitor upwardly, parallel to a wall or downwardly. The cord management hook 626 is shown as being able to be flexibly manipulated to allow for all of the different pitch courses for the mount.

Other variations and combinations of features will be apparent to those with skill in the art. Those variations are included within the disclosure herein.

What is claimed is:

1. A video monitor mount comprising:

a wall piece having an integral bubble level, the wall piece including a first cradle and a second cradle separated from the first cradle;

a support bar configured to be supported by the first cradle and second cradle, and wherein the support bar is configured to extend between the first cradle and second cradle, and wherein the support bar is configured to rotate within the first cradle and second cradle; and a cord management hook comprising a first loop and a second loop, the second loop separated from the first loop, the first loop configured to mate with the support bar and to slide along the support bar, and wherein the second loop is configured to receive at least one cord, wherein the wall piece comprises a wall portion, and wherein the first cradle and second cradle extend from the wall portion at an angle not parallel with the wall portion, and wherein the first cradle comprises a first latch, and wherein the second cradle comprises a second latch, and wherein the first latch is configured to alternate between an open configuration such that the support bar can be placed in the first cradle and a closed configuration such that the support bar cannot be removed from the first cradle, and wherein the second latch is configured to alternate between an open configuration such that the support bar can be placed in the second cradle and a closed configuration such that the support bar cannot be removed from the second cradle.

2. The mount of claim 1 wherein at least one of the first cradle and second cradle further comprises a screw hole and wherein at least one of the first latch and second latch comprises a screw hole matched with the screw hole of the first cradle or second cradle, and wherein the latch is locked in position when a screw is inserted between the latch and cradle.

3. A video monitor mount comprising:

a wall piece having an integral bubble level, the wall piece including a first cradle and a second cradle separated from the first cradle;

a support bar configured to be supported by the first cradle and second cradle, and wherein the support bar is configured to extend between the first cradle and second cradle, and wherein the support bar is configured to rotate within the first cradle and second cradle; and a cord management hook comprising a first loop and a second loop, the second loop separated from the first loop, the first loop configured to mate with the support bar and to slide along the support bar, and wherein the second loop is configured to receive at least one cord further comprising a first monitor bracket including a first aperture and a second monitor bracket including a second aperture, and wherein the support bar is configured to slide within the first aperture and second aperture and wherein the first monitor bracket slides with respect to the support bar independent of the second monitor bracket and wherein the second monitor bracket slides with respect to the support bar independent of the first monitor bracket.

4. A video monitor mount comprising:

a wall piece having an integral bubble level, the wall piece including a first cradle and a second cradle separated from the first cradle;

a support bar configured to be supported by the first cradle and second cradle, and wherein the support bar is configured to extend between the first cradle and second cradle, and wherein the support bar is configured to rotate within the first cradle and second cradle; and a cord management hook comprising a first loop and a second loop, the second loop separated from the first loop, the first loop configured to mate with the support bar and to slide along the support bar, and wherein the second loop is configured to receive at least one cord wherein the wall piece comprises a wall portion and wherein the wall piece further includes a tilt bar between the first cradle and second cradle and wherein the tilt bar is spring loaded with a knob including a position selection device configured to lock the tilt bar in a position at an angle with respect to the wall portion.

5. A video monitor mount comprising:

a wall piece having an integral bubble level, the wall piece including a first cradle and a second cradle separated from the first cradle;

a support bar configured to be supported by the first cradle and second cradle, and wherein the support bar is configured to extend between the first cradle and second cradle, and wherein the support bar is configured to rotate within the first cradle and second cradle; and a cord management hook comprising a first loop and a second loop, the second loop separated from the first loop, the first loop configured to mate with the support bar and to slide along the support bar, and wherein the second loop is configured to receive at least one cord and wherein the wall piece further includes a tilt bar extending between the first cradle and second cradle, wherein the support bar comprises a first monitor bracket and a second monitor bracket mounted thereon, further comprising a knob to turn the tilt bar to tilt the first monitor bracket and second monitor bracket at an angle with respect to the wall piece.

* * * * *